United States Patent
Gugliotta

[11] 3,882,650
[45] May 13, 1975

[54] PIPE-AND-BALL TRUSS ARRAY

[76] Inventor: Paul F. Gugliotta, 39 E. 20th St., New York, N.Y. 10003

[22] Filed: May 21, 1974

[21] Appl. No.: 471,874

[52] U.S. Cl.................. 52/223 R; 52/648; 403/176
[51] Int. Cl.............................................. E04b 1/56
[58] Field of Search.......... 52/648, 655, 650, 223 R, 52/81, 80, 227, 230; 403/6, 7, 171, 170, 176, 202

[56] References Cited
UNITED STATES PATENTS

| 3,220,152 | 11/1965 | Sturm | 52/648 |
| 3,632,147 | 1/1972 | Finger | 403/176 X |
| 3,789,562 | 2/1974 | Chicchis | 52/81 X |

FOREIGN PATENTS OR APPLICATIONS

| 1,073,078 | 3/1954 | France | 403/171 |
| 1,489,468 | 6/1967 | France | 403/171 |

Primary Examiner—Price C. Faw, Jr.
Attorney, Agent, or Firm—Hubbell, Cohen, and Stiefel

[57] ABSTRACT

A pipe-and-ball truss array comprising a plurality of truss members which each comprise an outer hollow pipe and an inner rod running through the pipe along the longitudinal axes thereof, and a hollow spherical member common to the plurality of truss members, which truss members are joined to the spherical member by bolting. The outer pipe bears against the exterior surface of the spherical member and the inner rod extends beyond the ends of the outer pipe and through an aperture in the sphere into the interior thereof. The ends of the inner rod are threaded and a nut is threadably mounted thereon within the interior of the sphere and tightened so as to simultaneously place the inner rod element of the truss member in tension and the outer hollow pipe element of the same truss member in compression whereby applied tensile, compressive and axial forces are transferrable between the plurality of joined truss members through the spherical member. In order to allow for different compressive or tensile loads within the structure, the truss members may have a different outer or inner diameter for the outer hollow pipe depending on the compressive load to be carried by the particular truss member or the inner rod may have a different diameter dependent on the tensile load to be carried by the particular truss member or any combination thereof dependent on the loads to be carried by the various truss members. If desired, the spherical member may comprise two hemispheres which are joined together, such as by bolting, or may comprise a substantially unitary sphere. The truss array may be a two dimensional space truss or a three dimensional space frame constructed from a plurality of interconnected truss modules.

14 Claims, 5 Drawing Figures

PIPE-AND-BALL TRUSS ARRAY

BACKGROUND OF THE INVENTION

1. Field of the Invention

The present invention relates to pipe-and-ball truss arrays such as the type utilized for space trusses and space frames.

2. Description of the Prior Art

Space frames are well known in the art, such as the type normally known as pipe-and-ball space frames. Prior art space frames of this type, such as disclosed in British Pat. No. 1,206,399, have utilized threaded pipes which thread into the ball joints or have been of the type utilizing pipes which are welded to the ball joints. Both of these types of interconnections are costly. Some prior art space frames, such as the structure utilized for the Polish pavillon in the International Exhibition in Brussels in 1958, utilize tension elements, such as flexible rods, which are bolted within a hollow ball joint or sphere by nuts which are tightened to place these elements in tension, in conjunction with separate reinforced concrete members which are placed in compression. This is a costly arrangement and, furthermore, the tension elements may not be utilized where compressive loads occur nor are the concrete elements usable where tensile loads occur. Thus, prior art ball-and-pipe, truss arrays, such as space frames, have not economically satisfactorily provided higher strength or resistance to compressive, tensile and axial loads without increased costs.

SUMMARY OF THE INVENTION

A pipe-and-ball truss array is provided which comprises a plurality of truss members, at least a first hollow spherical member portion, such as a hemisphere or a substantially unitary sphere, common to the plurality of truss members and first means, such as bolting means, for joining the plurality of truss members to the first spherical member portion. Each of the truss members comprises an outer hollow pipe element having a longitudinal axis and first and second ends and an inner rod element extending through the outer hollow pipe element along the longitudinal axis. The inner rod element has first and second ends and the first spherical member portion has a plurality of spaced apart apertures extending from the exterior surface thereof to the interior thereof. Each of the inner rod elements first ends extend beyond the outer hollow pipe element first end and through an associated one of the apertures in the first spherical member portion, this end having threads thereon. Each of the outer hollow pipe element first ends bears against the first spherical member portion exterior surface. The first joining means comprises first threadable nut means threadably mounted in the first spherical member portion interior on the inner rod element threaded first ends and bearing against the interior surface of the first spherical member portion for simultaneously placing the inner rod element of the truss member in tension and the outer hollow pipe element of the same truss member in compression, whereby applied tensile, compressive and axial forces are transferrable between the joined truss members through the first spherical member.

Similarly, other hollow spherical members are provided and the truss members are interconnected therebetween, with the inner rod element of an associated truss member which spans between two spherical members being bolted at the extremities within the spherical members so as to place the rod in tension and the outer hollow pipe element portion of the truss member which bears against the exterior surface of the spherical members simultaneously being placed in compression so that the truss member may carry applied tensile, compressive and axial forces and transfer these forces between truss members which are joined to spherical members through the spherical members, such as to a support for the truss array. The truss array may be a two dimensional space truss or a three dimensional space frame which may be formed from a plurality of interconnected truss modules, such as a triangular module comprising three spherical members and three truss members interconnected therebetween or a three dimensional module, such as a rhomboid, parallelipiped, cube or pyramid.

If the spherical member is formed from two hemispheres which are bolted together, each hemisphere may contain additional truss members bolted thereto so as to increase the number of available truss members given arrangement compared to when unitary substantially members are utilized, such unitary members preferably having an opening therein through which the nuts may be threadably tightened on the inner rod elements to bolt the truss members to the spherical member. The inner rod element preferably extends through spacer elements, such as washers located within the interior of the outer hollow pipe element and is supported therein by these spacer elements.

If desired, since all of the truss members do not carry the same compressive, tensile or axial loads in a truss array, different size truss members may be utilized dependent on the type and value of the load to be carried thereby. For example, either the inner or outer diameter of the outer hollow pipe element for one truss member may be different from another truss member if the truss member is to carry a different compressive load then the other truss member or the diameter of the inner rod element may be different from that of another truss member if the truss member is to carry a different tensile load than the other truss member, these different size truss members being joined to a common spherical member for transfer of the compressive tensile and axial forces between the different size joined truss members through the spherical member. With respect to varying the inner diameter of the outer hollow pipe element while maintaining the outer diameter thereof constant so as to vary the thickness, the truss array may be aesthetically uniform while structurally being arranged to compensate for different compressive loads required by different truss members. The outer hollow pipe elements may be formed from a material selected from the group consisting of steel, aluminum, concrete, wood, fiberglass and plastic, the spherical member may preferably be formed from a material collected from the same group of materials and the inner rod element may preferably be formed from a material selected from the group consisting of steel, aluminum, wood, fiberglass and plastic, the resultant truss member, if desired, being formed from like materials or a mixture of these materials, however, the inner rod element not being formed from concrete as concrete is not highly resistant to the tensile loads to be carried by the inner rod element.

DETAILED DESCRIPTION OF THE PREFERRED EMBODIMENTS

Figure 1:
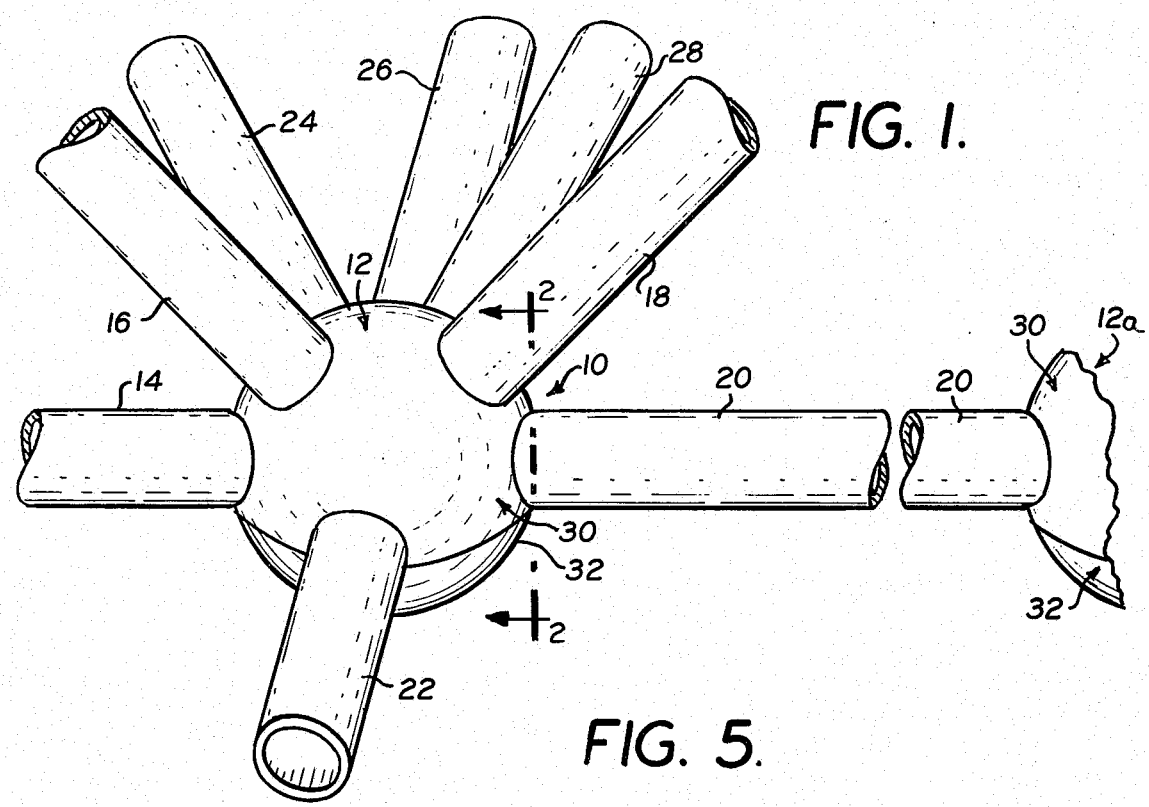
FIG. 1 is a fragmentary perspective view of a typical preferred ball-and-pipe joint in the preferred ball-and-pipe truss array.
Figure 2:
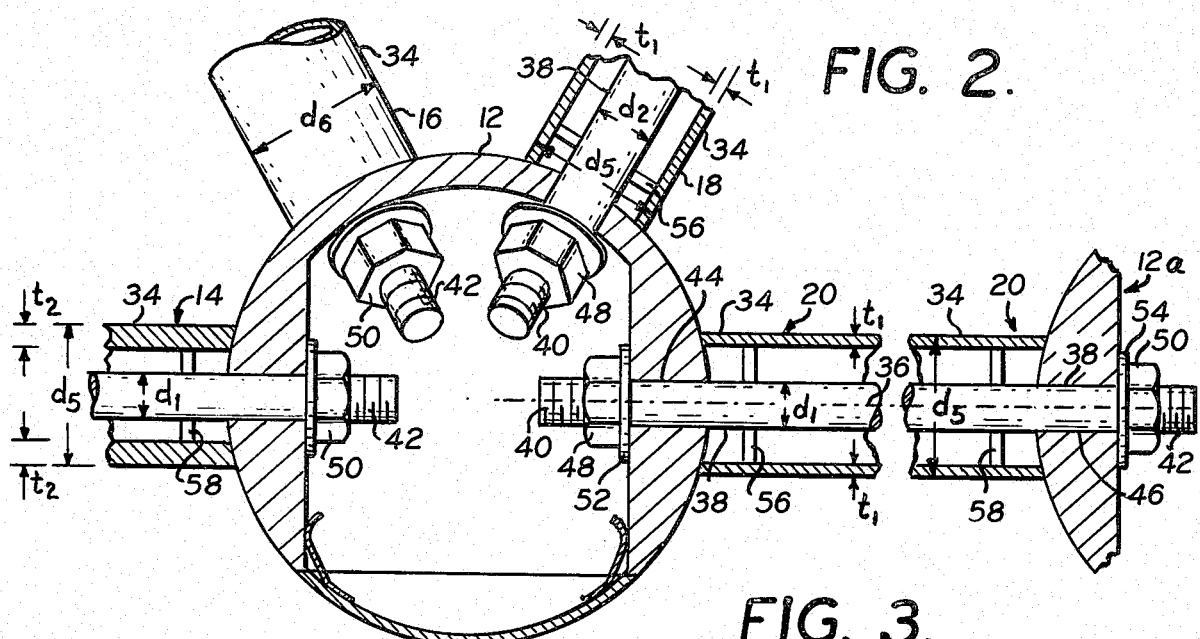
FIG. 2 is a fragmentary sectional view taken along line 2—2 of the embodiment shown in FIG. 1.

Referring now to the drawings in detail and initially to FIGS. 1 and 2, a typical preferred ball-and-pipe joint of the preferred ball-and-pipe truss array is shown. The joint, generally referred to by the reference numeral 10 preferably comprises a hollow ball or sphere 12 to which a plurality of truss members are joined, preferably by bolting, in a manner illustrated in FIG. 2 and to be described in greater detail hereinafter, eight such truss members 14, 16, 18, 20, 22, 24, 26 and 28 being shown by way of example in FIG. 1. The ball or sphere 12 preferably comprises a pair of sections 30 and 32 with section 30, as illustrated in FIG. 1, preferably being the section or portion to which the truss members 14 through 28, inclusive, are joined and section 32 merely being a removable cover which enables access to the interior of the sphere 12 as illustrated in FIG. 2. The truss members 14 through 28 inclusive, are preferably designed, as will be described in greater detail hereinafter to carry both compressive, tensile and axial loads, these forces being transferrable between the joined truss members through the ball or sphere 12, as will be described in greater detail hereinafter.

As shown and preferred in FIG. 2, a typical preferred truss member 20 preferably comprises an outer hollow pipe or tubular member 34 having a longitudinal axis 36 and an inner rod element 38 which preferably extends through the center of the outer hollow pipe element 34 along the longitudinal axis 36 thereof. As also shown and preferred in FIG. 2, the ends 40 and 42 of the inner rod element 38 are threaded and extend beyond the ends of the outer pipe element 34 a sufficient distance so as to be insertable into the interior of the sphere 12 and 12a, respectively, through apertures 44 and 46, respectively, therein. The length of the inner rod element 38 is preferably a sufficient length to enable these ends 40 and 42 to extend into the interior of the spheres 12 and 12a respectively, a sufficient amount to enable threading of a nut 48 and 50, respectively, thereon to bolt the inner rod element 38 to the spheres 12 and 12a, respectively. As shown and preferred, washers 52 and 54, respectively, are placed between the nut 48 and 50, respectively and the interior surface of the sphere 12 and 12a, respectively. Spacer means, such as washers 56 and 58, respectively, are preferably located near the ends of the outer pipe element 34 for supporting the inner rod element 38 in position in the outer pipe element 34 of the truss member 20, the washers 56 and 58 having an aperture therein through which the inner rod element 38 passes. If desired, additional washers may be placed along the length of the inner rod element 38 within the interior of the outer hollow pipe element 34 for added support.

In utilizing the preferred typical joint of FIG. 1 in a ball-and-pipe truss array, the cover 32 of the sphere 12 is initially removed. A typical truss member, such as truss member 20, which preferably comprises the outer hollow pipe element 34 whose ends may preferably be mere cutlengths of structural pipe, and the inner rod element 38 which is supported within the interior of the outer hollow pipe element 34 by washers 56 and 58, is then aligned between two spheres, 12 and 12a in the example shown, to which it is to be joined for transferring compressive, tensile and axial loads therebetween, with the inner rod element 38 having the ends 40 and 42, respectively, passing through apertures 44 and 46, respectively, in the spheres 12 and 12a, respectively. Nuts 48 and 50 are then tightened, such as by inserting a wrench through the opening provided by the removal of cover 32, with washers 52 and 54 preferably between the nuts 48 and 50, respectively and the interior of the spheres 12 and 12a, respectively. These nuts 48 and 50 are tightened a sufficient amount to preferably place the inner rod element 38, which is preferably a flexible rod, in tension with a desired tensile load thereon while simultaneously placing the outer hollow pipe element 34 in compression between the two spheres 12 and 12a, the ends of outer pipe element 34 bearing against the exterior surface of the spheres 12 and 12a. Thus, by tightening of the nuts 48 and 50 joining the truss member 20 to the spheres 12 and 12a, the inner rod element is placed in tension while, simultaneously the outer pipe element is placed in compression, the truss member 20 thereby being able to carry compressive as well as tensile and axial loads. The same procedure is repeated for all of the truss members 14 through 28, inclusive connecting the truss members between sphere 12 and associated spheres located at the opposite end of the respective truss members 14 through 28, inclusive so that each of the truss members 14 through 28 is capable of carrying compressive, tensile and axial loads, these forces being transferrable between the truss members through the spheres.

Figure 3:
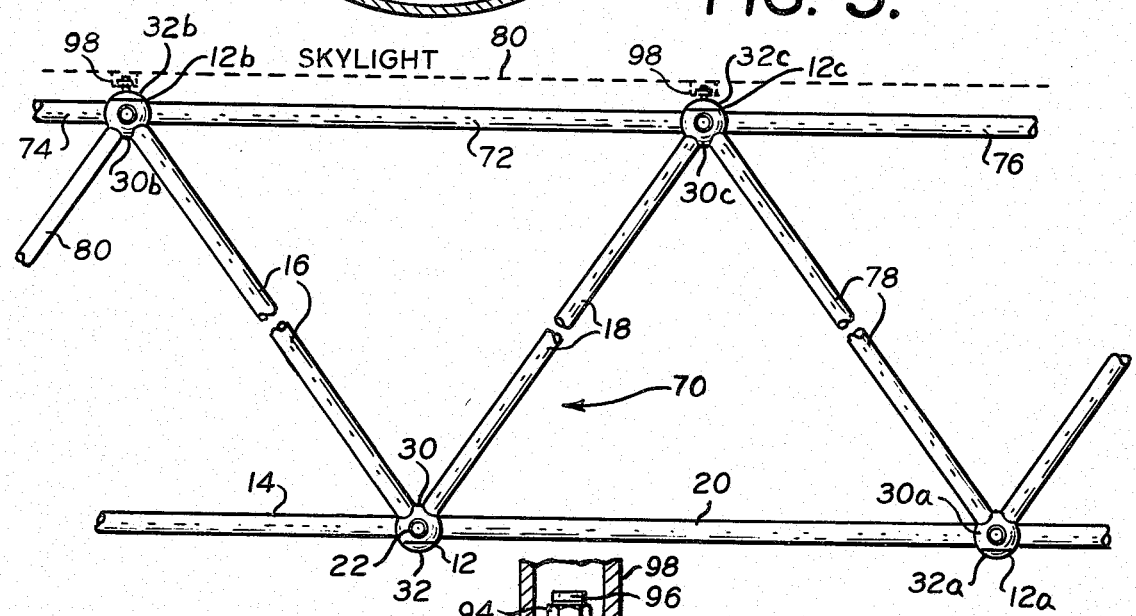
FIG. 3 is a fragmentary side elevation of a typical ball-and-pipe truss array utilizing the preferred joint of FIG. 1.

Referring now to FIG. 3, a typical ball-and-pipe truss array, generally referred to by the reference numeral 70, is shown, the truss array 70 comprising a plurality of truss modules which are, by way of example, triangular for a two dimensional space truss or pyramidal for a three dimensional space frame. The configuration illustrated in FIG. 3 is only shown by way of example and any other type of truss array, such as a space frame having truss modules which are rhomboids, parallelipipeds, or cubes may be constructed utilizing the ball-and-pipe joint of the present invention. In the arrangement illustrated in FIG. 3, assuming the truss module is utilized to construct a two dimensional space truss, wherein the truss module is triangular, or assuming the truss module is a pyramid utilized to construct a three dimensional space frame with the truss members being shown only in one plane for purposes of clarity, truss member 16 extends between spheres 12 and 12b, truss member 18 extends between sphere 12 and 12c and an identically constructed truss member 72 extends between spheres 12b and 12c to form one face of the pyramidal truss module if the array is a three dimensional space frame or to form a triangular module if it is a two dimensional space truss. Each of the truss members 16, 18 and 72 is preferably identical in configuration with that previously described with reference to the typical truss member 20; that is, the truss member preferably consists of an outer hollow pipe element similar to pipe element 34 and an inner rod element similar to rod element 38 which is supported within the interior of the outer element 34 by washers 56 and 58, with the inner rod element 38 having threaded ends 40 and 42 upon which nuts 48 and 50 are threaded within the interiors of the respective spheres 12, 12b and 12c. Thus, truss member 18 is connected between spheres 12 and 12c and joined to these spheres by tightening of a nut 48 on end 40 of the inner rod element of truss member 18 within sphere 12 and nut 50 on the other end 42 of the inner rod element 38 of truss member 18 within sphere 12c so as to place the inner rod element of truss member 18 in tension while simultaneously placing the outer pipe element 34 of truss member 18 in compression between the two spheres 12 and 12c with the ends of truss member 18 bearing against the exterior surface of spheres 12 and 12c. Similarly, the ends of the inner rod element 38 of truss member 16 and the inner rod element 38 of truss member 72 extend into the interiors of spheres 12 and 12b, and 12b and 12c, respectively and are bolted in place by means of nuts 48 and 50 within the interiors of these respective spheres to place the inner rod elements of the truss members 16 and 72, respectively, in tension while simultaneously placing the hollow pipe elements 34 of these truss members 16 and 72 in compression between the respective spheres 12 and 12b, and 12b and 12c, with the ends of the truss members 16 and 72 bearing against the exterior surface of spheres 12 and 12b, and 12b and 12c, respectively. Accordingly, compressive, tensile and axial loads may be transferred between the various truss members 16, 18, 72, 14 and 20, as well as any other truss members connected to the spheres 12, 12b and 12c through these spheres. These loads may then be transferred to the supports for the truss array (not shown).

Referring once again to FIGS. 2 and 3, if desired the truss members 14 through 28, 72, 74, 76 and 78 illustrated in FIG. 3 and FIG. 2 may all be of the same dimension; that is, the outer diameters of outer pipe elements 34 may all be the same, the thickness of the outer pipe elements 34 and the diameters of the inner rod element 38 may all be the same, with the parameters being selected for the worst case load condition. However, such a worst case condition is normally present only in a relatively small percentage of truss members, such as one percent or less, of a truss array. Accordingly, as shown and preferred in FIGS. 2 and 3, the parameters of the respective truss members may be varied so as to be chosen dependent on the compressive, tensile and/or axial load to be carried by the particular truss member, the narrower the diameters or thickness of the outer pipe and inner rod elements comprising the truss member, the less the load to be carried and the greater the diameter or thickness of the outer pipe 34 and inner rod elements 38 of the truss member, the greater the load to be carried. For example, as illustrated in FIG. 2, assuming truss members 14 and 20 are to carry different compressive loads, truss member 14 carrying a greater compressive load than truss member 20, and, assuming it is desired to have a constant outer diameter or pipe size for the truss members, such as 14 and 20 for aesthetics, then the thickness $t_2$ of outer hollow pipe element 34 is preferably increased, the thickness $t_2$ of the outer pipe element 34 of truss member 14 being greater than the thickness $t_1$ of outer pipe element 34 of truss member 20 by a selected amount which may be conventionally chosen so as to allow for the relative compressive loads to be carried by truss members 14 and 20. The outer diameter $d_5$ of the outer pipe elements 34 of truss members 14 and 20, in this example, preferably being identical and the diameter $d_1$ of the inner rod elements 38 of truss members 14 and 20, in this example, preferably being identical. Assuming that truss members 16 and 20 are also to carry different compressive loads, with truss member 16 carrying a greater compressive load than truss member 20, the thickness of outer pipe element 34 as well as the diameter $d_1$ of the inner rod element 38 may be identical and the outer diameter $d_6$ of outer pipe element 34 of truss member 16 could be made greater than the outer diameter $d_5$ of outer pipe element 34 of truss member 20 a sufficient amount, selected in conventional fashion, to allow for the relative compressive loads to be carried by truss members 16 and 20. Lastly, in the example shown in FIG. 2, assuming that truss members 18 and 20 are to carry different tensile loads, and assuming that outer pipe element 34 of truss number 18 and outer pipe element 34 of truss member 20 have the same thickness $t_1$ and outer diameters $d_5$, the diameter $d_2$ of inner rod element 38 of truss member 18 could preferably be made greater than the diameter $d_1$ of inner rod element 38 of truss member 20 if the tensile loads to be carried by truss member 18 is greater than the tensile loads to be carried by truss member 20. The opposite variations in these parameters could be accomplished if the compressive and/or tensile loads are to be less than that carried by truss member 20 as opposed to greater, as in the example given. Of course, any combination of these, such as an increased diameter for the inner rod element and a greater outer diameter for the outer pipe element, or any other combination, may be accomplished in order to adjust for variations in the compressive and/or tensile loads to be carried by the various truss members since, as is well known, in a typical truss array, loads in an individual truss member may vary from maximum tension to maximum compression along the length of the truss array. Accordingly, as shown and preferred in FIG. 2, many different size inner rod elements 38 and different size outer pipe elements 34 may be connected to a common sphere 12, with the size preferably being determined by the load to be carried by the particular truss member either in tension, compression or shear. It should be noted that the size or diameter of the sphere 12 is preferably determined by the size of the outer pipe elements 34, the size of the inner rod elements 38 and the loads to be carried, a larger sphere 12 being utilized where larger loads are to be carried. The selection of the sizes of the elements comprising the truss members as well as the sizes of the various spheres may be accomplished in conventional fashion based on a conventional load analysis for the truss array.

Figure 4:
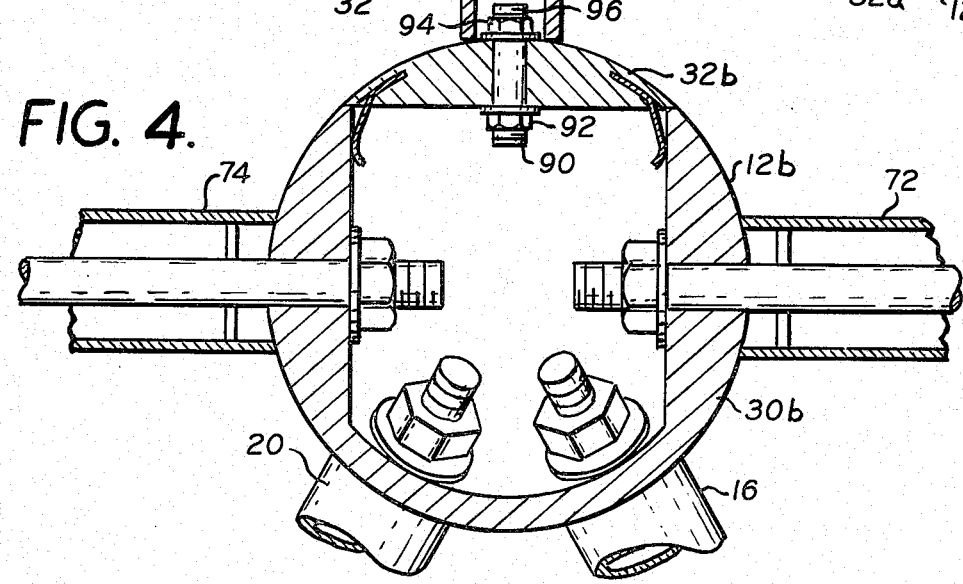
FIG. 4 is an alternative embodiment of the arrangement illustrated in FIG. 2 illustrating additional means for supporting an element above or below the truss array.

Referring now to FIGS. 3 and 4, a modification of the preferred joint of the present invention is shown. If desired, a structure, such as a skylight 80 by way of example, may be supported above or below the truss array 70. In order to support such a structure, for example a skylight 80 above the truss array 70, an aperture may be provided in the cover portion 32b of the sphere 12b through which a threaded bolt 90 may be passed. Nuts 92 and 94 may be tightened on the ends of the bolt 90, with the end 96 of the bolt 90 extending outside of the cover portion 32b of the sphere 12b into attachment housing 98 for the skylight structure 80, which attachment housing 98 is then bolted to the spheres 12b by means of nut 94 and bolt 90. The cover portion 32b of the sphere 12b may be secured to the other portion 30b of the sphere 12b in any conventional fashion, such as by bolting (not shown).

Figure 5:
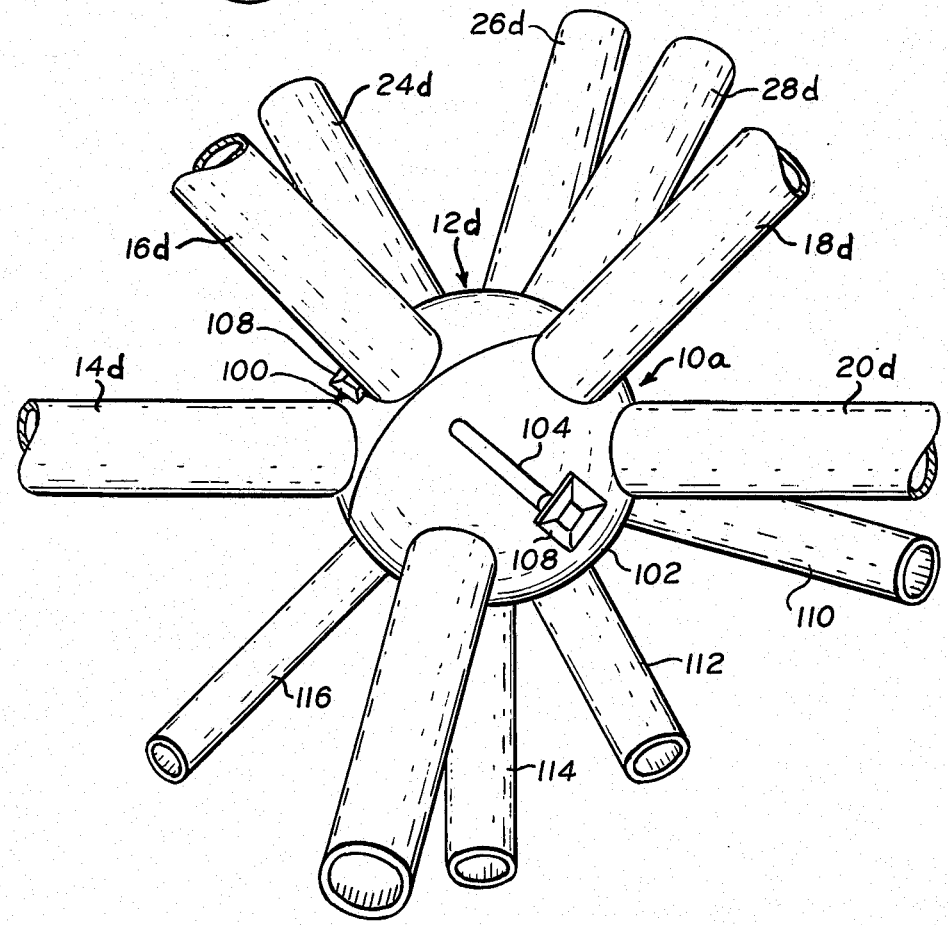
FIG. 5 is an alternative embodiment of the ball-and-pipe joint of FIG. 1 wherein the ball comprises two joinable pipe containing sections.

Now referring to FIG. 5, an alternative embodiment of the joint 10 illustrated in FIG. 1 as shown. The primary difference between the joint 10 of FIG. 1 and the joint 10a of FIG. 5 is that the ball or sphere 12d preferably consists of two hemisphere portions 100 and 102 as opposed to the substantially unitary spherical portion 30 and spherical cover portion 32, each of the hemisphere portions 100 and 102 preferably having truss members, preferably identical in configuration to the truss numbers previously described with reference to truss member 20 by way of example, joined thereto in the same fashion, preferably, as truss member 20 is joined to portion 30 of sphere 12. The two hemisphere portions 100 and 102 are preferably bolted together such as by a through bolt 104 and nuts 106 and 108 threadable on the ends of bolt 104. Although only one bolt 104 is shown by way of example. As many additional through bolts as necessary may be utilized to secure the two hemisphere portions 100 and 102 together. In this manner, more truss members may be joined to the resultant sphere 12d than in the arrangement previously described with reference to FIG. 1, since all portions of the sphere may have truss members joined thereto, the interior of both hemisphere portions 100 and 102 being accessible for tightening of the nuts on the ends of the inner rod elements of the truss members prior to the bolting of the two hemispheres 100 and 102 together to form the assembled sphere 12d. In the preferred embodiment of FIG. 1, the cover portion 32 does not have any truss members extending therefrom and preferably only covers an opening in portion 30 which is only of sufficient size to allow access to the interior of the sphere 12 to enable tightening of the nuts on the inner rod elements. Thus, by way of example, if the sphere 12 of FIG. 1 in an arrangement of the type of FIG. 1 would enable eight truss members to be connected to the sphere 12 the arrangement which is illustrated in FIG. 5 would enable by way of example, four more truss members to be connected to the sphere 12d at the location where the cover portion 32 was utilized in the arrangement of FIG. 1.

The various elements comprising the preferred truss arrays of the present invention may be formed of a variety of materials, either all the same material or any combination thereof. For example, the outer piping element of the truss members and the spheres may preferably be formed of a material selected from the group consisting of steel of various grades including stainless steel, aluminum, concrete, fiberglass, plastic or wood and the inner rod element of the truss members may be formed of a material selected from the group consisting of steel of various grades including stainless steel, aluminum, fiberglass, plastic or wood.

It should be noted that the truss array need not provide a symmetrical pattern, the location of the truss members being determined by the geometry of the truss modules which are interconnected to transfer the loads to the supports for the truss array. Furthermore, these load transfers occur with the truss array in any orientation, such as horizontal, vertical or at an angle, the load being transferred throughout the truss array to the supports with the tension, compression and shear being transferred from one truss member to the others via the spheres.

It is to be understood that the above described embodiments of the invention are merely illustrative of the principles thereof and numerous modifications and embodiments of the invention may be derived within the spirit and scope thereof.

What is claimed is:

1. A pipe-and-ball truss array comprising a plurality of truss members, at least a first hollow spherical member portion common to said plurality of truss members and first means for joining said plurality of truss members to said first spherical member portion, each of said truss members comprising a outer hollow pipe element having a longitudinal axis and first and second ends and an inner rod element extending through said outer hollow pipe element along said longitudinal axis, said inner rod element having first and second ends, said first spherical member portion having a plurality of spaced apart apertures extending from the exterior surface thereof to the interior thereof, each of said inner rod element first ends extending beyond said outer hollow pipe element first end and through an associated one of said first spherical member portion apertures and having threads thereon, each of said outer hollow pipe element first ends bearing against said first spherical member portion exterior surface, said first joining means comprising first threadable nut means threadably mounted in said first spherical member portion interior on said inner rod element threaded first ends and bearing against the interior surface of said first spherical member portion for simultaneously placing said inner rod element of said truss member in tension and said outer hollow pipe element of the same truss member in compression, whereby applied tensile, compressive and axial forces are transferrable between said joined truss members through said first spherical member.

2. A pipe-and-ball truss array in accordance with claim 1 further comprising at least a second hollow spherical member portion spaced apart from said first hollow spherical member portion, said second hollow spherical member portion having at least one aperture therein extending from the exterior surface thereof to the interior thereof, at least one of said plurality of truss members extending between said first and second hollow spherical member portions, said one truss member outer hollow pipe element second end bearing againt said second hollow spherical member portion exterior surface, said one truss member inner rod element second end extending beyond said one truss member outer hollow pipe element second end and through said second hollow spherical member portion one aperture and having threads thereon, said truss array still further comprising second joining means for joining said one truss member to said second spherical member portion, said second joining means comprising second threadable nut means threadably mounted in said second spherical member interior on said one truss member inner rod element threaded second end and bearing against the interior surface of said second spherical member portion for simultaneously placing said inner rod element of said one truss member in tension and said outer hollow pipe element of said one truss member in compression between said first and second spherical member portions.

3. A pipe-and-ball truss array in accordance with claim 2 further comprising at least one additional truss member, said one additional truss member comprising an outer hollow pipe element having a longitudinal axis and first and second ends and an inner rod element extending through said outer hollow pipe element along said longitudinal axis, said one additional truss member inner rod element having first and second ends, said second spherical member portion having another spaced apart aperture extending from the exterior surface thereof to the interior thereof, said one additional truss member outer hollow pipe element first end bearing against said second hollow spherical member portion exterior surface, said one additional truss member inner rod element first end extending beyond said one additional truss member outer hollow pipe element first end and through said second hollow spherical member portion other aperture and having threads thereon, said truss array still further comprising third joining means for joining said one additional truss member to said second spherical member portion, said third joining means comprising third threadable nut means threadably mounted in said second spherical member interior on said one additional truss member inner rod element threaded first end and bearing against the interior surface of said second spherical member portion for simultaneously placing said inner rod element of said one additional truss member in tension and said outer hollow pipe element of said one additional truss member in compression, whereby applied tensile, compressive and axial forces are transferrable between said joining truss members through said spherical members.

4. A pipe-and-ball truss array in accordance with claim 3 further comprising at least a third hollow spherical member portion spaced apart from said first and second hollow spherical member portions, said third hollow spherical member portion having at least one aperture therein extending from the exterior surface thereof to the interior thereof, at least said one additional truss member extending between said second and third hollow spherical member portions, said one additional truss member outer hollow pipe element second end bearing against said third hollow spherical member portion exterior surface, said one additional truss member inner rod element second end extending beyond said one additional truss member outer hollow pipe element second end and through said third hollow spherical member portion one aperture and having threads thereon, said truss array still further comprising fourth joining means for joining said one additional truss member to said third spherical member portion, said fourth joining means comprising fourth threadable nut means threadably mounted in said third spherical member interior on said one additional truss member inner rod element threaded second end and bearing against the interior surface of said third spherical member portion for simultaneously placing said inner rod element of said one additional truss member in tension and said outer hollow pipe element of said one additional truss member in compression between said second and third spherical member portions, said first, second and third spherical members and said joined truss members comprising a truss module which is interconnectable with adjacent modules for transferring compressive, tensile and axial loads between said truss members to a support for said truss array.

5. A pipe-and-ball truss array in accordance with claim 4 wherein said third spherical member portion includes another spaced apart aperture extending from the exterior surface thereof to the interior thereof, at least another of said plurality of truss members extending between said first and third hollow spherical member portions, said other truss member outer hollow pipe element second end bearing against said third hollow spherical member portion exterior surface, said other truss member inner rod element second end extending beyond said other truss member outer hollow pipe element second end and through said third hollow spherical member portion other aperture and having threads thereon, said truss array further comprising fifth joining means for joining said other truss member to said third spherical member portion, said fifth joining means comprising fifth threadable nut means threadably mounted in said third spherical member interior on said other truss member inner rod element threaded second end and bearing against the interior surface of said third spherical member portion for simultaneously placing said inner rod element of said other truss member in tension and said outer hollow pipe element of said other truss member in compression between said first and third spherical member portions, whereby compressive, tensile and axial forces are transferrable between said joined truss members through said spherical members.

6. A pipe-and-ball truss array in accordance wtih claim 4 wherein a plurality of said interconnected truss modules comprises a space truss.

7. A pipe-and-ball truss array in accordance with claim 4 wherein a plurality of said interconnected truss modules comprises a space frame.

8. A pipe-and-ball truss array in accordance with claim 1 wherein said first hollow spherical member portion comprises a first hemisphere portion, said truss array further comprises a second hemisphere portion joinable with said first hemisphere portion to form a sphere, second means for joining said first and second hemisphere portions together, at least one additional truss member, and third means for joining said one additional truss member to said second hemisphere portion, said additional truss member comprising an outer hollow pipe element having a longitudinal axis and first and second ends and an inner rod element extending through said outer hollow pipe element along said longitudinal axis, said inner rod element having first and second ends, said second hemisphere portion having at least one aperture extending from the exterior surface thereof to the interior thereof, said one additional truss member inner rod element first end extending beyond said one additional truss member outer hollow pipe element first end through said second hemisphere portion one aperture and having threads thereon, said one additional truss member outer hollow pipe element first end bearing against said second hemisphere portion exterior surface, said third joining means comprising second threadable nut means threadably mounted in said second hemisphere portion interior on said one additional truss member inner rod element threaded first end and bearing against the interior surface of said second hemisphere portion for simultaneously placing said inner rod element of said one additional truss member in tension and said one additional truss member outer hollow pipe element in compression, whereby applied tensile, compressive and axial forces are transferrable between said joined truss member including said one additional truss member through said joined first and second hemisphere portions.

9. A pipe-and-ball truss array in accordance with claim 8 wherein said first and second hemisphere portions each include at least one additional aperture extending from the exterior surface thereof to the interior thereof, said second joining means comprising third nut means extending through both said first and second hemisphere portion additional apertures.

10. A pipe-and-ball truss array in accordance with claim 1 wherein at least one of said plurality of truss members has at least a different outer diameter for said outer hollow pipe element than another one of said plurality of truss members, said outer diameter being at least dependent on the compressive load to be carried by said truss member, said one truss member and said other truss member at least carrying different compressive loads.

11. A pipe-and-ball truss array in accordance with claim 1 wherein at least one of said plurality of truss members has at least a different thickness for said outer hollow pipe element than another one of said plurality of truss members said thickness being at least dependent on the compressive load to be carried by said truss member, said one truss member and said other truss member at least carrying different compressive loads.

12. A pipe-and-ball truss array in accordance with claim 1 wherein at least one of said plurality of truss members has at least a different diameter inner rod element than another one of said plurality of truss members, said diameter being at least dependent on the tensile load to be carried by said truss member, said one truss member and said other truss member at least carrying different tensile loads.

13. A pipe-and-ball truss array in accordance with claim 1 further comprising spacer means within the interior of each of said outer hollow pipe elements for supporting said associated inner rod element within said associated outer hollow pipe element.

14. A pipe-and-ball truss array in accordance with claim 1 wherein said outer hollow pipe element is formed from a material selected from the group consisting of steel, aluminum, concrete, wood, fiberglass and plastic; said spherical member is formed from a material selected from the group consisting of steel, aluminum, concrete, wood, fiberglass and plastic; and said inner rod element is formed from a material selected from the group consisting of steel, aluminum, wood, fiberglass, and plastic.

* * * * *